E. S. RITCHIE.
Marine Compass.

No. 105,492.

Patented July 19, 1870.

United States Patent Office.

EDWARD S. RITCHIE, OF BROOKLINE, MASSACHUSETTS.

Letters Patent No. 105,492, dated July 19, 1870.

IMPROVEMENT IN MARINE COMPASSES.

The Schedule referred to in these Letters Patent and making part of the same.

*To all persons to whom these presents may come:*

Be it known that I, EDWARD S. RITCHIE, of Brookline, of the county of Norfolk and State of Massachusetts, have made a new and useful invention having reference to Marine Compasses, having their bowls filled with a liquid; and I do hereby declare the same to be fully described as follows, reference being had to the accompanying drawing, of which—

Figure 1:
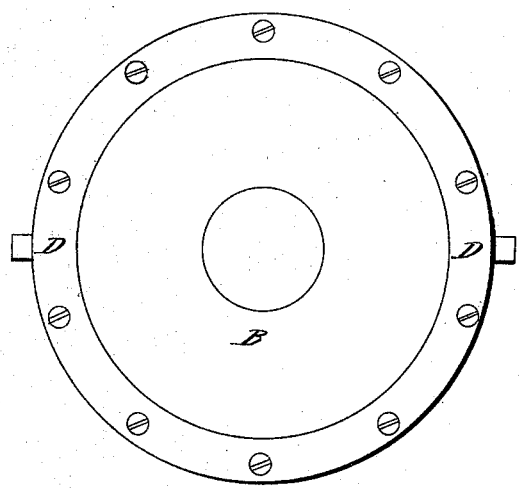

Figure 1 is a top view, and

Figure 2:
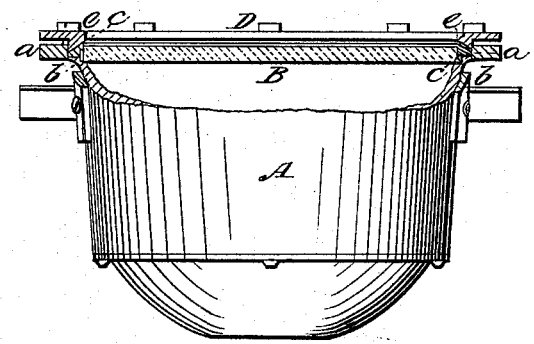

Figure 2, a transverse section of a compass-bowl with its glass set thereon in accordance with my invention.

The object or purpose of my improvement is to securely hold the glass in place with a water-tight joint, and prevent the breakage of such glass during the act of setting down the screws for confining the cap-ring in place upon the glass, as well as from any subsequent change, resulting from the expansion of the glass on any of the parts about it, or otherwise.

In the common way, heretofore practiced by me, of arranging the India rubber packing, it has been placed in a groove disposed underneath the glass, the latter being forced down upon the packing by a cap-ring held in place by screws. Sometimes I also placed a thin packing over the glass and between it and the cap-ring.

The difficulty experienced in this method of packing the glass plate of the compass-bowl was that an irregular pressure was frequently exerted on the glass by the cap-ring, which, by subsequent changes of temperature, or other cause, rendered the glass plate liable to being broken; in fact breakage of it was so common as to cause me to devise a better or my present plan of accomplishing the end desired.

In doing this, I form the compass-bowl A with an annular rebate or socket, *a*, of a diameter somewhat larger than that of the glass plate B, viz., large enough for the socket to receive the packing C, which is a strip of vulcanized India rubber, or its equivalent, extending entirely around the periphery of the glass plate.

In order to centralize the glass plate properly there may be an auxiliary socket rebate or annular space, *b*, leading out of and below the packing-socket, in manner as represented in fig. 2.

Next, I construct the cap-ring D with an annular lip, *e*, to extend around it and from its lower surface, and to rest directly upon and around the India rubber packing.

This lip may be triangular, or have any other proper form in its transverse section. I prefer to make it, in such section, a right-angled triangle, or thereabout.

When the cap-ring is pressed down by its series of screws, the lip will be forced upon and into the packing, and will expand it laterally, so as to cause it to fit closely to the periphery of the glass and to the encompassing shoulder and bottom of the recess, whereby a water-tight joint will be formed between them, without danger of breakage of the glass or any undue pressure being excited, which, from any cause as set forth, or otherwise, would be liable to produce injury to the glass.

I claim—

In the compass-bowl as described, the cap-ring as provided with the lip and the elastic packing, as arranged around and against the periphery of the glass plate, and in a rebate extended around such, the whole being as described, in order that, when the cap-ring is screwed down, the packing-ring may be expanded by the lip, in manner and for the purpose as set forth.

Also, the compass-bowl as made with the main and auxiliary rebates arranged in it and with the glass plate, in manner as described, and as having the packing arranged in the main rebate and around and against the periphery of the glass, and forced therein by a lip formed on the cap-ring, as explained.

EDW. S. RITCHIE.

Witnesses:
R. H. EDDY,
J. R. SNOW.